United States Patent [19]

Murty

[11] 4,131,566

[45] Dec. 26, 1978

[54] GRANULAR ACTIVATED CARBON MANUFACTURE FROM LOW RANK AGGLOMERATING BUT NOT GOOD COKING BITUMINOUS COAL TREATED WITH DILUTE INORGANIC ACID

[75] Inventor: Hari N. Murty, Grand Island, N.Y.

[73] Assignee: The Carborundum Company, Niagara Falls, N.Y.

[21] Appl. No.: 818,699

[22] Filed: Jul. 25, 1977

Related U.S. Application Data

[63] Continuation-in-part of Ser. No. 587,754, Jun. 17, 1975, abandoned.

[51] Int. Cl.² .............. C01B 31/10; C01B 31/08; B01J 21/18
[52] U.S. Cl. ................................ 252/423; 252/421; 252/422; 252/444
[58] Field of Search .............. 252/422, 423, 421, 444, 252/445; 423/449, 445, 460, 461

[56] References Cited

U.S. PATENT DOCUMENTS

| | | | |
|---|---|---|---|
| 3,539,467 | 11/1970 | Bozarth et al. | 252/445 |
| 3,623,999 | 11/1971 | Jungten | 252/421 |
| 3,843,134 | 10/1974 | Olson | 252/421 |
| 3,843,559 | 10/1974 | Repik et al. | 252/421 |
| 3,876,505 | 4/1975 | Stoneburner | 252/445 |
| 3,998,604 | 12/1976 | Hinkley | 44/1 R |
| 4,014,817 | 3/1977 | Johnson et al. | 252/421 |
| 4,039,473 | 8/1977 | Shafer | 252/425 |

FOREIGN PATENT DOCUMENTS 906754   8/1972   Canada .................................. 252/444

*Primary Examiner*—P. E. Konopka
*Attorney, Agent, or Firm*—David E. Dougherty; Robert C. Weber

[57] ABSTRACT

Granular activated carbon is manufactured from low rank agglomerating but not good coking bituminous coal by crushing and screening the as received coal to produce 8/30 mesh granules, which are treated with a dilute aqueous solution of inorganic acid to prevent fusion of the granules during subsequent devolatilization comprising: mixing the granules with the acid ($H_2SO_4$, $H_3PO_4$, HCl or mixtures thereof) at a concentration of about 1% to about 15% by weight, washing off the acid, drying the granules thoroughly and thereafter mixing the granules with about 5 to about 15% by weight of a carbonaceous binder such as coal tar pitch. The so treated granules are ground to at least about 65% by weight −325 mesh powder, which is compressed into shapes such as pellets of 0.5 inch diameter and 0.5 inch long under a pressure of 40,000 to 80,000 psi, and then granulated to obtain 6/20 mesh granules. These granules are first charred by heating to 250° C at 150° C/hour in an atmosphere of air and nitrogen and by maintaining the temperature for 4 hours, next devolatilized by heating to 450° C at 300° C/hour in an atmosphere of $N_2$ and the volatiles and by maintaining the temperature for 1 hour, and then activated by heating to 800° to 900° C in an atmosphere of $N_2$ and steam and by maintaining the temperature for 4 to 5 hours. The activated granules have a surface area of 1050 to 1090 m²/gram, an Iodine number of 900 to 1100, an ash content of 6 to 9%, an abrasion number 75 to 80, and an apparent density of 0.51 to 0.53 gram/cc, which properties make them suitable for use in water and waste water treatment and in other applications.

16 Claims, 1 Drawing Figure

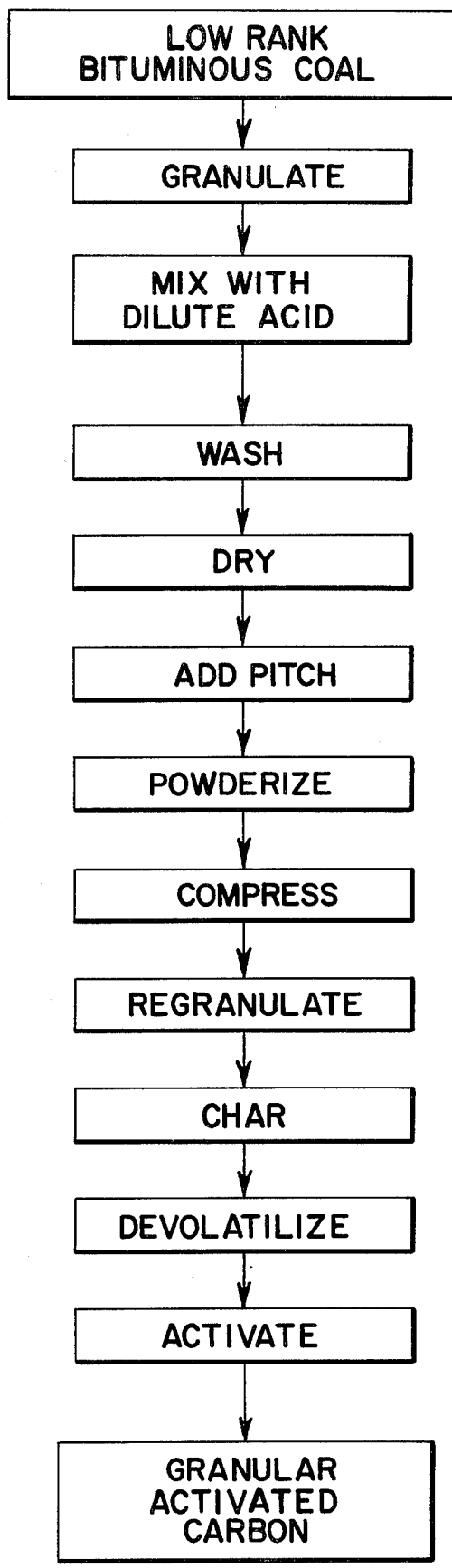

GRANULAR ACTIVATED CARBON MANUFACTURE FROM LOW RANK AGGLOMERATING BUT NOT GOOD COKING BITUMINOUS COAL TREATED WITH DILUTE INORGANIC ACID

This application is a continuation-in-part of Ser. No. 587,754, filed June 17, 1975, now abandoned and is related to my copending applications Ser. No. 884,084, filed Mar. 6, 1978 as a continuation-in-part of Ser. No. 818,700 filed July 25, 1977, now abandoned, as a continuation in part of Ser. No. 578,061, filed May 15, 1975, now abandoned and Ser. No. 585,931, filed June 11, 1975, now Pat. No. 4,032,476, issued June 28, 1977.

BACKGROUND OF THE INVENTION

1. Field of the Invention

This invention relates to granular activated carbon manufacture, and more particularly to a new and improved process for making granular activated carbon from low rank agglomerating but not good coking bituminous coal treated with dilute inorganic acid, and to a new and improved granular activated carbon made by such process and having properties which make it suitable for use in water and waste water treatment and in other applications.

Glossary of Terms

In order to facilitate a clear understanding of this invention, various terms of art employed herein are defined as follows.

Abrasion number — is a measure of the resistance of the activated carbon granules to degrading on being mechanically abraded. It is measured by contacting a sample with steel balls in a pan on a machine and shaking the contents for a given time and determining the resultant particle size distribution and hence the mean particle diameter. The abrasion number is the ratio of the final average (mean) particle diameter to the original average (mean) particle diameter (determined by screen analysis) times 100.

Activated carbon — is carbon which is "activated" by heating to high temperature preferably with steam or carbon dioxide as the activating agent in producing an internal porous particle structure.

Activating — means heating coal at high temperatures on the order of about 800°–900° C in the presence of a gaseous activating agent. As is well known in the art, the temperature can vary over a wider range, such as from 600° C to 1000° C.

Adsorption isotherm — is a measurement of the adsorptive capacity of an absorbent (viz. granular activated carbon) as a function of the concentration, or pressure, of the adsorbate (viz. $N_2$) at a given temperature. It is defined as the constant temperature relationship between the amount adsorbed per unit weight of adsorbent and the equilibrium concentration, or partial pressure.

Agglomerating but not good coking coals — these coals on carbonization (i.e., devolatilization) show a tendency to fuse together, but not coherently. These coals possess little or no resistance to degradation by impact and abrasion, as defined in ASTM Standard D294-64 (reapproved 1972) and these coals include high volatile B and C bituminous coals, with some exceptions, as defined in ASTM Standard D388-66 (reapproved 1972).

Apparent density — is the weight per unit volume of homogeneous granular activated carbon. To assure uniform packing of the granules during measurement, a vibrating trough is used to fill the measuring device.

Ash — is a principal mineral constituent of coal, carbon and pitch. It is normally defined as a weight percent basis after a given amount of sample is reduced to ash.

Average (mean) particle diameter — is a weighted average diameter of a granular activated carbon sample. A screen analysis is run and the average particle diameter is calculated by multiplying the weight of each fraction by its average diameter, adding the products, and dividing by the total weight of the sample. The average diameter of each fraction is taken as the size midway between the sieve opening through which the fraction has passed and the sieve opening on which the fraction was retained. It usually is expressed in mm.

Charring — means heating coal at low temperatures on the order of about 250° C in the presence of oxygen. It will be recognized that depending on the type of coal, charring could be done at lower or higher temperatures (e.g., 175°–275° C) for a longer or shorter time respectively.

Coking value — is usually expressed as percent residual carbon obtained when a dry sample of coal, tar or pitch is vaporized or pyrolized for a specific time of a specific temperature that limits the available oxygen supply (ASTM Method D-2416). The coking value, expressed as percent residual carbon, indicates the coke forming properties of the material.

Devolatilizing — means heating coal at intermediate temperatures on the order of about 450° C in the absence of oxygen. It will be recognized that depending on the type of coal, devolatilizing could be done at lower or higher temperatures (e.g., 400°–600° C) for a longer or shorter time respectively.

Granular activated carbon — is "activated carbon" which has a particle size, i.e., "mesh", which is not less than about 40 and preferably not less than about 60.

High volatile A bituminous coal — is a bituminous coal which has, by weight, a dry fixed carbon content of less than 69%, dry volatile matter of more than 31%, and a moist Btu/lb. of 14,000 or more (ASTM Standard D-388-66).

Iodine number — is the milligrams of iodine adsorbed by one gram of granular activated carbon at an equilibrium filtrate concentration of 0.02 N iodine. It is measured by contacting a single sample of carbon with an iodine solution and extrapolating to 0.02 N by an assumed isotherm slope. This number can be correlated with the ability of granular activated carbon to adsorb low molecular weight substances.

Low rank bituminous coal — includes high volatile B bituminous coal, which has a moist Btu/lb. of 13,000 or more but less than 14,000, and high volatile C bituminous coal, which has a moist Btu/lb. of 10,500 or more but less than 13,000 (ASTM Standard D-388-66).

Medium volatile bituminous coal — is a bituminous coal which has, by weight, a dry fixed carbon content of 69% or more and less than 78% and dry volatile matter of 31% or less, but more than 22% (ASTM Standard D-388-66).

Mesh — (or mesh size) is the particle size of granules as determined by the U.S. Sieve Series or the Tyler Series. Usually, this term refers to the sizes of the two screens, in either of the above Series, between which the bulk of a sample falls. For example, "8/30 mesh" (or "8 by 30 mesh" or "8 × 30 mesh") means that 90% by weight of the sample will pass through a No. 8 screen but will be retained on a No. 30 screen. Alternatively, this term refers to a maximum particle size, such as in defining the fineness of powder material. For example, "65% by weight −325 mesh powder" means that 65% by weight of a given sample passes through a No. 325 mesh screen.

Pitch — is a black or dark viscous substance obtained as a residue in the distillation of organic materials and especially tars.

Powder — means powdered activated carbon having a particle size, i.e., "mesh", which is smaller than about 40 and preferably smaller than about 60. The larger the mesh number, the smaller the size.

Surface area — is the amount of surface area per unit weight of granular activated carbon; it is determined from the nitrogen adsorption isotherm by the Brunauer, Emmett and Teller (BET) method, and it is expressed in $m^2$/gram (square meters per gram).

It is to be noted, in addition to the above definitions of high volatile A, B and C bituminous coals, that all of these coals can vary from a very highly coking coal to very poorly coking coal depending upon the history and type of coal.

In general, high volatile A bituminous coals or the higher ranked medium and low volatile bituminous coals, such as those normally found in the eastern United States, are good coking coals, with a large free swelling index number (ASTM Test No. D-720-67), and on coking yield a coke that is strong and shows resistance to crushing (load bearing capability ASTM Test No. D-294-64).

In contrast, in general terms, because of the higher volatile matter content, etc., high volatile B and high volatile C bituminous coals, depending upon the specific constituents, could be very poorly coking in that coke resulting from such coals have little cohesion and they break down readily im the tumbler test (ASTM Test No. D-294-64). Some of these coals, possibly because of lower fixed carbon content, etc., also on carbonization yield coke that has no internal strength but show good swelling, as for example in the case of popcorn which swells greatly on heating but has little cohesion.

These descriptions of the said coals used here are only meant to generally describe and hence differentiate them in regard to their origin as related to their carbonization behavior and such descriptions are meant to be illustrative and not restrictive.

2. Prior Art

Granular activated carbon is particularly useful in water and waste water treatment not only because it is highly effective in purifying the intake, as well as the effluent from municipal and industrial systems but also because it can be regenerated for repeated use. However, in order to accomplish these objectives it must possess certain properties, namely a minimum surface area of about 900 $m^2$/gram for adequate adsorption capacity, a minimum Iodine number of about 900 for adequate adsorption of low molecular weight substances, a maximum ash content (by weight) of not more than about 12 percent, and preferably not more than about 8 percent, for purity, a minimum abrasion number of about 70 and preferably not less than about 80, for adequate hardness in maintaining granular integrity in use and in regeneration, and a minimum apparent density of not less than about 0.46 gram/cc, preferably about 0.48 gram/cc, for obtaining the dense, closely packed beds and columns needed in water and waste water treatment.

These properties can be obtained by making granular activated carbon from bituminous coal, such as a good coking high volatile A bituminous coal or a good coking medium volatile bituminous coal, but until the present invention it is not known that anyone else has accomplished this by using coals other than these select few bituminous coals, which are highly coking with excellent coking strength, and low ash. To date, little success has been attained in using any coals other than these select few in making hard, active, low ash granular carbon, as described above.

Too many liquid tar like components given out during devolatilization of the granules prior to activation tend to coat the granules and fuse them together, and thus render them unsuitable for activation; this explains the limitations on liquid components and hence coking strength of the coal discussed above. Too few liquid components given out during carbonization of granules, like those obtained from poorly coking coals leads to poor strength of the granules and this explains why only such select few bituminous coals have been useful in making hard granular activated carbon. Since only 25 to 30% by weight of the starting coal results in granular activated carbon, and since the preferred range of ash in the granular activated carbon is about 8%, the ash content of the above noted suitable bituminous coals is very much limited to be under 3%, and this explains one of the limitations described above.

There have been some attempts in the past, as set forth in U.S. Pat. No. 3,630,959, to overcome the aforementioned problems by addition of concentrated acids to coal. While this attempted to solve the problem of handling the tar-like liquids, it did not in any way help to solve the ash content limitations of the carbon (in fact with direct addition of acid to coal the ash content of the activated carbon was higher than that obtained from the coal processed without the acid). More importantly, practicing the art taught by this patent, does not allow one to make a hard granular activated carbon; this is due to the fact that the mix was carbonized and the resulting carbonized material would not have the cohesion or strength required to make hard granular activated carbon.

In contrast, in the present invention, a method has been developed which can use a wide variety of coals encompassing the general description of low rank bituminous coals as raw materials in making hard, adsorptive granular activated carbons. In the present invention, for such starting coals which were medium to poorly coking, the coals are granulated, treated with a dilute aqueous solution of inorganic acid selected from the group consisting of HCl, $H_3PO_4$, $H_2SO_4$, and mixtures thereof, washed, dried thoroughly, mixed with binder like coal tar pitch, milled to a fine powder, compacted, granulated, charred, devolatilized and activated. As becomes evident from the descriptive Examples, this method: (a) afforded the use of such coals of varied coking character (the acid treatment presumably renders these coals suitable as a raw material for producing hard, granular activated carbons) which was hitherto not possible; (b) afforded the use of such coals that yeild many tar like components during devolatilization, where the acid treatment is believed to change the coal (such that it altered the amount of liquid components given off during devolatilization after acid treatment as compared to coal with no such treatment), (c) afforded the use of such coals that are very poorly coking where the said coals after acid treating and washing were mixed with pitch, ground to fine particle size, compacted, granulated and then were processed to make hard granular activated carbons, and (d) afforded the use of such coals with higher ash content up to about 6-9%. This would not have been possible without the acid treatment where such treatment is believed to alter the devolatilizing behavior of the coal and, thus render it suitable for activation.

Further, when the non-coking sub-bituminous coals were used, as described in my aforesaid copending application Ser. No. 578,061, and when they were treated in dilute aqueous acid solutions, it has been found that the charring step necessary for the coking coals, can be eliminated completely, and that if appropriate acid treatment is employed, this results in a significant and unexpected improvement in the yield of the granular activated carbons from said coal as well as a significant improvement in the desired adsorption and abrasion properties of the granular activated carbons.

SUMMARY OF THE INVENTION

Accordingly, a general primary objective of the present invention is to provide: (1) a new and improved process for making hard granular activated carbon from a number of low rank bituminous coals of different coking character; for making hard granular activated carbon from such coals having ash content higher than 3% or 4%; for making hard granular activated carbon from such coals which yield many liquid components during devolatilization (carbonization) by subjecting the said coals to treatment in dilute aqueous inorganic acid solutions where the type and amount of liquid components coming off during devolatilization was presumably altered, changed or modified, and for making hard granular activated carbon from poorly or non-coking types of such coals by subjecting the said coals to acid treating prior to processing, and (2) a new and improved hard granular activated carbon made by such process and suitable for use in water and waste water treatment and in other applications. To this end, the invention includes (1) a process for making hard granular activated carbon comprising: forming granules from low rank agglomerating but not good coking bituminous coal; treating the granules with a dilute aqueous solution of inorganic acid to prevent fusion of the granules during subsequent devolatilization comprising: mixing the granules with acid, washing off the acid, drying the granules thoroughly (i.e., to a moisture content of not more than about 5% by weight, preferably not more than about 3% by weight, and thereafter mixing the granules with a carbonaceous binder such as pitch; reducing the treated granules to form fine powder; compressing the powder to form shapes; reducing the shapes to reform granules; charring the reformed granules by heating to and at a charring temperature in an oxygen containing atmosphere; devolatilizing the charred granules by heating to and at a devolatilizing temperature higher than the charring temperature in an oxygen-free atmosphere; and activating the devolatilized granules by heating to and at an activating temperature higher than the devolatilizing temperature in an atmosphere containing a gaseous activating agent; and (2) hard granular activated carbon made by such process and preferably having an abrasion number of not less than about 70.

A specific primary objective is to provide (1) such process wherein the coal has, in the as received condition, an ash content of not more than about 9% by weight and a BTU/lb of about 11,000 to about 14,000; the acid is selected from the group consisting of $H_2SO_4$, $H_3PO_4$, HCl and mixtures thereof; the acid concentration between about 1 and about 15% by weight; the binder is about 5 to about 15% by weight; and the powder is at least about 65% by weight $-325$ mesh and is compressed to form shapes under a pressure of not less than about 40,000 psi; and (2) such granular activated carbon made by such process and having an abrasion number of not less than about 75.

Another specific objective is to provide (1) such process wherein the acid is a mixture of $H_3PO_4$ and HCl; and (2) such granular activated carbon made by such process and having an abrasion number of not less than about 80.

A more specific primary objective is to provide: (1) such process wherein the acid is a mixture of HCl and $H_3PO_4$; and (2) such granular activated carbon made by such process and having an abrasion number of not less than about 80.

Additional objectives and advantages of the invention will become apparent upon consideration of the following detailed description and accompanying drawing wherein:

BRIEF DESCRIPTION OF THE DRAWING

The single FIGURE is a block diagram or flow sheet illustrating schematically the various steps of the process, as well as the resulting product, both embodying the invention.

DESCRIPTION OF THE PREFERRED EMBODIMENTS

In this detailed description, reference will be made to seven Examples, of which Example 1 provides a background of the problems involved in making granular activated carbon from poorly coking to medium coking, low rank bituminous coals, and Examples 2, 3, 4 and 5 are illustrative of the invention wherein the said coals are acid treated and successfully processed. Example 5 illustrates the situation of mixed acids treating of the said coal, with high ash content. Examples 6 and 7 illustrates the situation where the use of a high rank, high volatile A bituminous coal leads to granular activated carbon with the required properties. Examples 1 to 5 employ or require a charring step in addition to the acid treatment step, whereas Examples 6 and 7 illustrate that the high rank coal can be utilized to make granular activated carbon without the acid treatment, but still requiring the charring step.

EXAMPLE 1

Use of Low Rank Bituminous (High Volatile B or C) Coal in Making Granular Activated Carbon A batch of low rank bituminous (high volatile B or C) coal, having the following analyses, by weight, was used.

| Proximate Analysis | | | Ultimate Analysis | | |
|---|---|---|---|---|---|
| | As Received | Dry | | As Received | Dry |
| % Moisture | 3.91 | — | Moisture | 3.91 | — |
| % Volatile Matter | 42.73 | 44.47 | % C | 72.7 | 75.66 |
| % Ash | 6.27 | 6.53 | % $N_2$ | 0.36 | 0.375 |

| Proximate Analysis | | | Ultimate Analysis | |
|---|---|---|---|---|
| | As Received | Dry | | As Received | Dry |
| % Fixed Carbon | 47.09 | 49.00 | % H | 5.0 | 5.2 |
| BTU/lb. | 12,900 | — | % S | 0.9 | 0.94 |
| | | | % Ash | 6.27 | 6.53 |

These analyses are, in general, typical of a low rank (high volatile B or C type) bituminous coal. The coal was dried thoroughly (i.e., to a moisture content of not more than about 1 or 2% by weight) and mixed with 10 parts per 100 of No. 125 coal tar pitch having the following characteristics:

| Softening Point | 129.2° C |
|---|---|
| Benzene Insolubles | 33.2% by weight |
| Quinoline Insolubles | 13.1% by weight |
| Coking Value (Conradson) | 61.1% by weight |
| Ash | 0.17% by weight. |

The mix was thoroughly milled into a fine powder such that at least 65% of the powder passed through 325 mesh; the powder was pressed into pellets of 1/2 inch diameter and 1/2 inch high using a pressure of 40,000 to 80,000 psi. The bulk density of the pellets was in the range 1.1 to 1.2 gram/cc and they were granulated to obtain 6 × 20 mesh granules having an apparent density of 0.65 to 0.68 gram/cc.

600 grams of the granules were loaded into a cylindrical container prepared from 50 mesh screen and the container was mounted onto a cylindrical shaft and the assembly was loaded into a cylindrical furnace so that the container and the granules therein were rotated slowly and uniformly inside the furnace (1–8 rpm).

The granules were heated in an oxygen-free atmosphere such as nitrogen, to 450° C at a rate of 150° C/hour and maintained there for 1 hour; during this process, the granules were slowly and uniformly rotated (1 to 8 rpm). At the end of the run the granules were removed from the furnace and it was found that the granules were fused into a mass (which had poor crushing strength since it disintegrated easily), and hence were unsuitable for activation to produce hard, adsorptive, granular activated carbon.

Another batch of 6 × 20 mesh granules was prepared as described above, loaded into the cylindrical furnace, heated in an atmosphere consisting of nitrogen and air (oxygen is the reacting gas) to 250° C at 150° C/hour and kept there for 4 to 5 hours, where presumably the coal granules were exposed to the oxidizing action of oxygen. The weight loss in this step was 5 to 15%. The material at the end of the hold period was further heated to 450° C at 150° C/hour and kept at this temperature for 1 hour for devolatilization. At the end of the run, the granules were removed and it was found that the granules still fused into a mass, despite the oxidation step, and were unsuitable for activation to produce hard, adsorptive, granular activated carbon.

Further, in the devolatilization process, with or without the oxidation step, it was observed that the fused granules had the appearance of typical hollow spheres, indicating a preponderance of liquid products given off during devolatilization, and further indicating that unless these liquid products are handled appropriately, the hollow spheres produced, even if they can be retained as individual granules, would not possess the cohesion and strength required to make hard, granular activated carbon of uniform activity. This clearly demonstrated that neither of the methods attempted above namely devolatilization, with or without the charring step, can be utilized to devolatilize the coal-pitch granules successfully in making granular activated carbon.

EXAMPLE 2

Use of $H_2SO_4$ Treated Low Rank Bituminous Coal in Making Granular Activated Carbon A batch of high volatile B or C, low rank bituminous coal having the same analyses described in Example 1 was crushed and screened to obtain 8 × 30 mesh granules. 300 grams of the granules were loaded into a 4 liter kettle and a dilute aqueous acid solution consisting of 300 cc of 95% concentrated (by weight) $H_2SO_4$ and 2700 cc of water was added to the granules (about 10% by volume or about 13% by weight concentration of acid in solution). The granules and the acid solution were heated to 80 to 100° C and maintained at this temperature for 5 to 8 hours, while the granules were continuously stirred. During the course of these experiments, it was learned that the size of the granules, the temperature of treating (which is usually below 100° C because it is done in aqueous acid solutions), the time of treating, the concentration of acid in the aqueous solution, and the ratio of aqueous solution to coal all have important effects on the processability of the coal in making hard, adsorptive granular activated carbons. For example, coarser granules than 8 × 30 mesh could be employed where the treating conditions have to be more severe (higher acid concentration, temperature and/or longer time). Similarly, finer granules could be used when less severe treating conditions could be employed.

At the end of the acid mixing operation, the contents were allowed to cool, the solution was decanted for reuse, and the granules were thoroughly rinsed, such that the wash water off the granules analyzed to a pH of 6 to 7. The washed granules were dried thoroughly, and mixed with 10 parts per 100 of coal tar pitch of the type described in Example 1. The mixture was milled to a fine powder such that at least 65% of the powder passed through a 325 mesh screen.

The powder was pressed into cylindrical pellets ½ inch diameter by ½ inch height using a pressure of 40,000 to 80,000 psi, the apparent density of the pellets being in the range 1.1 to 1.2 gram/cc. The pellets were regranulated to obtain 6 × 20 mesh granules having an apparent density of 0.65 gram/cc. 600 Grams of the granules were loaded into the cylindrical furnace described in Example 1 and were charred; this consisting of heating the granules at 150° C/hour to 250° C and holding at 250° C for 4 hours in an atmosphere consisting of 1 standard cubic foot per hour (SCFH) of air and 1 SCFH of nitrogen. At the end of the charring step, the air inflow to the furnace was shut off and the granules were heated to 450° C for devolatilization in an atmosphere of nitrogen and held at temperature for 1 hour. At the end of the devolatilization, the furnace was cooled and it was found that the granules did not fuse as in Example 1, and they were hard, having an apparent density of 0.61 gram/cc. The granules were then activated in an activation furnace in an atmosphere containing steam at a temperature of 800°–900° C for 4 to 5 hours. The activated granules analyzed to an Iodine number of 1000, surface area of 1090 square meters per gram, an ash content of 8% by weight, an apparent density of 0.53 gram/cc and an abrasion number of 78, which properties make it extremely well suited for use in water and waste water treatment and in other applications.

From the above description it is patently obvious that: when an attempt was made to produce granules from the said coal, without any prior acid treatment, such attempts met with failure because of fusion and creation of hollow granules during devolatilization; while at the same time subjecting the said coal to the instant inventive process of treating in dilute aqueous inorganic acid solution and charring the treated granules, hard granular activated carbon has been obtained despite the poor coking character of the said coal. Further, and more specifically, despite the fact that the said coal had over 6% by weight ash in the as received condition, in this inventive process a granular activated carbon product containing no more than 8% by weight ash has been obtained, which for reasons described in the prior art, would not have been possible, but for the inventive process.

During the course of experimentation, a batch of acid treated, washed, dried, compacted granules were devolatilized without the charring step described above, and the granules thus devolatilized were fused together, as described in Example 1, and thus were unsuitable for making hard granular activated carbon.

From the above description, it is patently obvious that hard adsorptive granular activated carbon could not be made from the above coal with either the acid treating or charring steps alone, and that a proper combination is required as described in this inventive process, to make granular activated carbon.

While it may be possible that, under specially designed, not yet known, charring conditions (which are designed to solve the problem of fusion) one may successfully devolatilize and activate the granules, it is believed from the prior art that such a process is likely to result in a much larger ash content in granular activated carbon (such as 3 to 4 times that of the starting coal), which tends to dilute the activity and reduce the hardness. Thus the uniqueness and inventiveness of the present process lies in a proper combination of acid treating and charring steps, which enable one to process the coal successfully into hard, adsorptive granular activated carbon.

EXAMPLE 3

Use of HCl Treated High Volatile B or C, Low Rank Bituminous Coal in Making Granular Activated Carbon A batch of low rank bituminous coal having the typical analyses described in Example 1 was crushed and screened to obtain 8 × 30 mesh granules. 300 grams of the granules were loaded into a 4 liter kettle and an aqueous acid solution consisting of 300 cc of 75% by weight concentrated HCl and 2700 cc of water was added to the granules (about 10% by volume or 13% by weight concentration of acid in solution). The granules and the acid solution were heated to 80 to 100° C and maintained at this temperature for 5 to 8 hours, while the granules were continuously stirred.

At the end of the acid mixing operation, the contents were allowed to cool, the acid solution decanted for reuse, and the granules were thoroughly rinsed, such that the wash water off the granules analyzed to a pH of 6 to 7. The washed granules were dried thoroughly, mixed with 10 parts per 100 of coal tar pitch of the type described in Example 1, and this mixture was milled to a fine powder such that at least 65% of the powder passed through a 325 mesh screen.

The powder was pressed into cylindrical pellets ½ inch diameter by ½ inch height using a pressure of 40,000 to 80,000 psi, the apparent density of the pellets being in the range 1.1 to 1.2 gram/cc. The pellets were regranulated to obtain 6 × 20 mesh granules having an apparent density of 0.65 gram/cc. 600 grams of the granules were loaded into the cylindrical furnace described in Example 1 and were charred as described in Example 2. At the end of the charring step, the air inflow to the furnace was shut off and the granules were heated to 450° C for devolatilization in an atmosphere of nitrogen and held at temperature for 1 hour. At the end of the devolatilization, the furnace was cooled and it was found that the granules did not fuse as in Example 1, they were hard and had an apparent density of 0.61 gram/cc.

The granules then were activated in an activation furnace in an atmosphere containing steam at a temperature of 800–900° C for 4 to 5 hours. The activated granules analyzed to an Iodine number of 900–1000, surface area of 1050 square meters per gram, an ash content of 6–8% by weight, an apparent density of 0.53 gram/cc and an abrasion number of 75, which properties make them extremely well suited for use in water and waste water treatment and in other applications.

During the course of experimentation, a batch of treated, compacted and reformed granules were devolatilized without the charring step described above and the granules thus devolatilized were fused together as in Example 1, being unsuitable for making hard granular activated carbon.

From this Example, it is evident that use of HCl is also slightly more effective in controlling ash content (6–8% versus 8% for the $H_2SO_4$ of Example 2) in the resulting granular activated carbon, although $H_2SO_4$ produces a slightly harder and more adsorptive product (1090 $m^2$/gram surface area, Iodine number of 1000 and abrasion number of 78, versus 1050, 900–1000 and 75, respectively, for HCl).

EXAMPLE 4

Use of $H_3PO_4$ Treated Low Rank Bituminous Coal in Making Granular Activated Carbon A batch of (high volatile B or C) low rank bituminous coal having the same analyses described in Example 1, was crushed and screened to obtain 8 × 30 mesh granules. 300 grams of the granules were loaded into a 4 liter kettle and an aqueous acid solution consisting of 300 cc of 85% by weight concentrated $H_3PO_4$ and 2700 cc of water was added to the granules (about 10% by volume or 13% by weight concentration of acid in solution). The granules and the acid solution were heated to 80 to 100° C and maintained at this temperature for 5 to 8 hours while the granules were continuously stirred.

At the end of the acid mixing operation, the contents were allowed to cool. The acid solution was decanted for reuse, and the granules were thoroughly rinsed such that the wash water off the granules analyzed to a pH of 6 to 7. The washed granules were dried thoroughly, and mixed with 10 parts per 100 of coal tar pitch of the type described in Example 1. The mixture was milled to a fine powder such that at least 65% of the powder passed through a 325 mesh screen.

The powder was pressed into cylindrical pellets ½ inch diameter by ½ inch height, using a pressure of 40,000 to 80,000 psi, the apparent density of the pellets being in the range 1.1 to 1.2 gram/cc. The pellets were regranulated to obtain 6 × 20 mesh granules having an apparent density of 0.63 gram/cc.

600 grams of the granules were loaded in the cylindrical furnace described in Example 1 and were charred, as in Examples 2 and 3. At the end of the oxidation step, the air inflow to the furnace was shut off and the granules were heated to 450° C for devolatilization in an atmosphere of nitrogen and held at temperature for 1 hour. At the end of the devolatilization, the furnace was cooled, and it was found that the granules did not fuse as in Example 1, were hard and had an apparent density of 0.60 gram/cc. The granules then were activated in an activation furnace in an atmosphere containing steam at a temperature of 800–900° C for 4 to 5 hours. The activated granules analyzed to an Iodine number of 1050, a surface area of 1100 square meters per gram, an ash content of 9% by weight, an apparent density of 0.52 gram/cc, and an abrasion number of 76, which properties make them extremely well suited for use in water and waste water treatment and in other applications.

From this Example, it is seen that $H_3PO_4$ is slightly less efficient in controlling ash content in the resulting product than $H_2SO_4$ (Example 2) of HCl (Example 3), but does produce a slight increase in the iodine number (1100 vs. 900–1000 for HCl and 1000 for $H_2SO_4$).

EXAMPLE 5

Use of Mixed Acid Treated Low Rank, High Ash, Bituminous Coal in Making Granular Activated Carbon A batch of low rank bituminous coal having, by weight, a typical analysis described below was crushed and screened to obtain 8 × 30 mesh granules.

| | Proximate Analysis | |
|---|---|---|
| | As Received | Dry |
| % Moisture | 1.3 | — |
| % Volatile Matter | 44.4 | 44.8 |
| % Ash | 8.8 | 8.9 |
| % Fixed Carbon | 46.5 | 46.3 |
| BTU/lb | 12,500 | |

From the analysis and the BTU data, it is seen that the coal is low rank bituminous coal and has a reasonably high ash content (8–9%). 300 grams of the granules were loaded into a 4 liter kettle and an aqueous acid solution consisting of 150 cc of concentrated HCl (75% by weight concentration), 150 cc of concentrated $H_3PO_4$ (95% by weight concentration), and 2700 cc of water was added to the granules (about 10% by volume or about 13% by weight concentration of acid in solution). The granules and the acid solution were heated to 80 to 100° C and maintained at this temperature for 5 to 8 hours while the granules were continuously stirred.

At the end of the acid mixing operation, the contents were allowed to cool, the acid solution was decanted for reuse, and the granules were thoroughly rinsed such that the wash water off the granules analyzed to a pH of 6 to 7. The washed granules were dried thoroughly and analysis thereof indicated an ash content of roughly 4% by weight. The dried granules were mixed with 10 parts per 100 of coal tar pitch of the type described in Example 1. The mixture was milled to a fine powder such that at least 65% of the powder passed through a 325 mesh screen.

The powder was pressed into cylindrical pellets ½ inch diameter by ½ inch height using a pressure of 40,000 to 80,000 psi, the apparent density of the pellets being in the range of 1.1 to 1.2 gram/cc. The pellets were regranulated to obtain 6 × 20 mesh granules having an apparent density of 0.65 gram/cc. 600 grams of granules were charred and devolatilized as in Example 4. At the end of the devolatilization, the furnace was cooled and it was found that the granules did not fuse as in Example 1, were hard and had an apparent density of 0.62 gram/cc. The granules were then activated as in Example 4.

The activated granules analyzed to an Iodine number of 1050, a surface area of 1000 m²/gram, an ash content of 6% by weight, an apparent density of 0.51 gram/cc, and an abrasion number of 80, which properties make them extremely well suited for use in water and waste water treatment and in other applications.

From this Example, it is also evident that the inventive process also is effective in reducing the ash content (from 8.8–8.9 to 6% by weight) particularly where a mixture of HCl and $H_3PO_4$ is used.

EXAMPLE 6

Use of High Volatile A Bituminous Coal and Pitch to Make Granular Activated Carbon The starting material was a batch of eastern bituminous coal having the following analyses by weight:

| Proximate Analysis | | | Ultimate Analysis | | |
|---|---|---|---|---|---|
| | As Received | Dry | | As Received | Dry |
| % Moisture | 2.04 | — | % Moisture | 2.04 | — |
| % Ash | 1.2 | 1.26 | % Carbon | 82.3 | 84 |
| % Volatile Material | 33.1 | 33.8 | % H | 5.2 | 5.29 |
| % Fixed Carbon | 63.6 | 64.9 | % $N_2$ | 1.3 | 1.33 |
| BTU/lb | 14,571 | 14,874 | % S | .34 | .35 |
| | | | % Ash | 1.23 | 1.26 |

These analyses are, in general typical of eastern bituminous high volatile coals having very low ash contents. These coals also are highly coking and low in ash content (ASTM Test No. D-720-67). The dried coal was crushed to obtain 8 × 30 mesh granules which were mixed with No. 125 coal tar pitch of the type described in Example 1, and in the ratio of 90 grams of coal granules and 10 grams of pitch (10 parts per 100, by weight).

The mixture was milled into very fine powder so that at least 65% of the powder passed through a 325 mesh screen. The milled powder was compressed into pellets ½ inch diameter and ½ inch high using a pressure of 40,000 to 80,000 psi. The pellets had a bulk density of 1.18 gram/cc and were granulated to obtain 6 × 20 mesh granules having an apparent density of 0.65 gram/cc.

600 grams of the granules were loaded into a cylindrical furnace and were subjected to the charring process such as described in Example 2, except that the charring consisted of heating the granules from room temperature to 250° C at 100° C/hour instead of 150° C/hour and maintaining at temperature for only 2 hours, as opposed to 4 to 5 hours. An atmosphere of 0.5 standard cubic feet per hour at 1 atmosphere and room temperature (SCFH) of $N_2$ and 0.5 SCFH of air was fed into the furnace while the cylindrical container was rotating at 1 to 4 rpm. In the course of experimentation, it was found that heating rate, atmosphere (particularly the amount of oxygen present), temperature and time at temperature were critical variables that had an important influence on how the granules were suited for further processing in making hard granular activated carbon. For example, too small a time (less than ½ hour) at temperature or too low a temperature (lower than 200° C), in general, led to difficulties in further processing of the granules. Thus, in the devolatilization (without charring) step, the granules fused together and were unsuitable for proper activation and for obtaining the desired properties of granular activated carbon.

When properly charred, as described above, the yield of the granules was 69% by weight, based on the dry coal pitch mixture and they had an apparent density of 0.62 gram/cc. In contrast to the eastern bituminous coal described in this Example, a charring step alone prior to devolatilization was not sufficient to produce granules suitable for activation from the low rank bituminous coal described in Example 1. As described earlier, the coal in Example 1 yielded too many liquid products, resulting in hollow spherical fused granules, on charring and devolatilization. Thus, the inventive process utilizes the acid treating together with charring in Examples 2-5 so that even a low rank bituminous coal such as that of Examples 1 and 5 can be made to yield hard granular activated carbon.

The properly charred granules obtained from this Example, then were devolatilized and activated in substantially the same manner as described in Example 2.

At the end of the process, hard granular activated carbon was obtained, with an overall yield of 34.0% by weight based on the dry coal pitch mixture. The granules had an apparent density of 0.50 gram/cc, an Iodine number of 1080, a surface area of 1040, an ash content of 2.2% by weight, and an abrasion number of 80.

Thus, the resulting granules were hard, very adsorptive, low in ash, and in all respects very much comparable to the grades of carbon preferred for use in waste water treatment and other applications. However, it is particularly noteworthy that hard granular activated carbon could not be made from this bituminous coal without subjecting the granules to the charring step described above, prior to devolatilization and activation.

It is pertinent to point out from the above that a good coking high volatile A bituminous coal can be used to produce a hard granular activated carbon using a charring step prior to devolatilization. However, the same process could not be applied to low rank bituminous coals as described in Examples 1 and 5, except by the present inventive process, as described in Examples 2 to 5.

EXAMPLE 7

Use of Acid Treated High Volatile A Bituminous Coal in Making Granular Activated Carbon The same procedure as set forth in Example 6, was followed through the initial granulating step. At this point, 300 grams of the coal granules were loaded into a 4 liter kettle. A dilute aqueous acid solution consisting of 300 cc of 95% by weight concentrated $H_2SO_4$ and 2700 cc of water was added to the granules (about 10% by volume or 13% by weight concentration of acid in solution). The mixture was heated to 80-90° C and maintained at this temperature for 5 hours while the granules were continuously stirred. The contents were allowed to cool, the acid solution decanted and the coal was thoroughly washed such that the wash water off the granules analyzed to a pH of 6 to 7.

The washed coal was dried thoroughly and was mixed with coal tar pitch, milled into at least 65% by weight −325 mesh powder, and pressed into pellets as in Example 6. The bulk density of the pellets was in the range of 1.1 to 1.2 gram/cc and they were regranulated to obtain 6 × 20 mesh granules having an apparent density at this stage of 0.64 gram/cc.

The reformed granules were charred as in Example 6, producing 70% by weight yield and an apparent density of 0.63 gram/cc. In the course of experimentation, it was learned that even for acid treated bituminous coal, the charring step still was necessary as a pre-treating step in order to obtain proper granular activated carbon.

The charred granules then were devolatilized and activated in the manner described in Example 6. At the end of the activation step, hard granular activated carbon was obtained with an overall yield of 35% by weight based on dry coal tar pitch mixture. The granules had an apparent density of 0.50 gram/cc and a surface area of 1000 $m^2$/gram, an Iodine number of 1050, an ash content of 2.5% by weight and an abrasion number of 80.

In comparing Examples 6 and 7, it is noteworthy that acid treating did not materially alter the yield and properties of the granular activated carbon and as set forth in Example 6, a granular activated carbon suitable for water and waste water treatment and in other applications can be made from this high volatile A bituminous coal without subjecting it to the acid treatment, provided the said coal has been charred prior to devolatilization.

In contrast the low rank bituminous coals of the type described herein could not be processed without the acid treating step, even when the charring step was employed. In fact, for such coals it was found that both the acid treating and charring steps were necessary in order to be able to make acceptable granular activated carbon from such coals.

From the foregoing inventive Examples 2-5, it is evident that when low rank bituminous coal is so acid treated in combination with the charring or heat oxidation step, hard, dense and highly active carbon granules are obtained. As clearly shown in Example 1 above, fusing of such low rank bituminous coal granules occurred during devolatilization, not only when first heated in an oxygen-free atmosphere, but also even when first heated in an oxidizing atmosphere. It was not until such granules were first treated with a dilute aqueous solution of inorganic acid, prior to charring or heat oxidation, as in Examples 2-5 above, that such fusing during devolatilization could be prevented, thereby producing the desired hard, dense and highly active carbon granules. Thus, it is the inventive acid treatment that makes the heat oxidation treatment work, and the combination of these two treatments that obtains the desired result of hard, adsorptive granular activated carbon.

The term "acid leaching" traditionally refers to removal of material, such as ash constituents, from coal, and usually employs relatively concentrated acids. In contrast to such traditional acid leaching, the present process deals with chemical treatment of the coal with dilute acids to make the coal suitable for producing hard granular activated carbon. For purposes of clarity, the term "acid leaching" has been removed from this disclosure and claims, and replaced by the term "acid treatment."

It now is seen how the invention accomplishes its various objectives. Likewise, it is to be understood that while the invention has been described and illustrated herein by reference to certain preferred embodiments, the same are to be considered as illustrative, rather than as limiting.

What is claimed is:

1. A process for making hard granular activated carbon having an abrasion number of not less than about 70 comprising:
   forming granules from low rank agglomerating but not good coking bituminous coal;
   treating the granules with a dilute aqueous solution of inorganic acid to prevent fusion of the granules during subsequent devolatilization comprising: mixing the granules with the acid for a time and at a temperature, acid concentration and solution to coal ratio sufficient to prevent said fusion, washing off the acid, drying the granules thoroughly, and thereafter mixing the granules with a carbonaceous binder;
   reducing the treated granules to form fine powder;
   compressing the powder to form shapes;
   reducing the shapes to reform granules;
   charring the reformed granules by heating to and at a charring temperature in an oxygen containing atmosphere;
   devolatilizing the charred granules by heating to and at a devolatilizing temperature higher than the charring temperature in an oxygen-free atmosphere; and
   activating the devolatilized granules by heating to and at an activating temperature higher than the devolatilizing temperature in an atmosphere containing a gaseous activating agent.

2. Hard granular activated carbon made by the process of claim 1.

3. The process of claim 1 wherein the coal has an ash content of not more than about 9% by weight.

4. The process of claim 1 wherein the acid is selected from the group consisting of $H_2SO_4$, $H_3PO_4$, HCl and mixtures thereof.

5. The process of claim 1 wherein the acid is $H_3PO_4$.

6. The process of claim 1 wherein the acid concentration is between about 1 and about 15% by weight.

7. The process of claim 1 wherein the binder is about 5 to about 15% by weight.

8. The process of claim 1 wherein the powder is at least about 65% by weight −325 mesh.

9. The process of claim 1 wherein the powder is compressed to form shapes under a pressure of not less than about 40,000 psi.

10. The process of claim 1 wherein the reformed granules are charred by heating to a temperature of about 250° C at a rate of about 150° C/hour in an atmosphere of air and nitrogen and by maintaining the charring temperature for a time of about 4 to about 5 hours.

11. The process of claim 1 wherein the charred granules are devolatilized by heating to a temperature of about 450° C at a rate of about 300° C/hour in an atmosphere of $N_2$ and the volatilie and by maintaining the devolatilizing temperature for a time of about 1 hour.

12. The process of claim 1 wherein the devolatilized granules are activated by heating to a temperature of about 800 to about 900° C in an atmosphere of $N_2$ and steam and by maintaining the activating temperature for a time of about 4 to about 5 hours.

13. The process of claim 1 wherein the coal has an ash content of not more than about 9% by weight; the acid is selected from the group consisting of $H_2SO_4$, $H_3PO_4$, HCl and mixtures thereof; the acid concentration is between about 1 and about 15% by weight; the binder is about 5 to about 15% by weight; the powder is at least about 65% by weight −325 mesh and is compressed to form shapes under a pressure of not less than about 40,000 psi; the reformed granules are charred by heating to a temperature of about 250° C at a rate of about 150° C/hour in an atmosphere of air and nitrogen and by maintaining the charring temperature for a time of about 4 to about 5 hours; the charred granules are devolatilized by heating to a temperature of about 450° C at a rate of about 300° C/hour in an atmosphere of $N_2$ and the volatiles and by maintaining the devolatilizing temperature for a time of about 1 hour; and the devolatilized granules are activated by heating to a temperature of about 800 to about 900° C in an atmosphere of $N_2$ and steam and by maintaining the activating temperature for a time of about 4 to about 5 hours.

14. Hard granular activated carbon made by the process of claim 13 and having an abrasion number of not less than about 75.

15. The process of claim 13 wherein the acid is a mixture of $H_3PO_4$ and HCl.

16. Hard granular activated carbon made by the process of claim 15 and having an abrasion number of not less than about 80.

* * * * *